US006358617B1

(12) United States Patent
Ohsaki et al.

(10) Patent No.: US 6,358,617 B1
(45) Date of Patent: Mar. 19, 2002

(54) LIGHT ABSORPTIVE ANTIREFLECTOR AND PROCESS FOR ITS PRODUCTION

(75) Inventors: Hisashi Ohsaki; Yuko Tachibana; Takuji Oyama; Hiromichi Nishimura, all of Yokohama; Yoshihito Katayama, Funabashi, all of (JP)

(73) Assignee: Asahi Glass Company, Limited, Tokyo (JP)

( * ) Notice: Subject to any disclaimer, the term of this patent is extended or adjusted under 35 U.S.C. 154(b) by 65 days.

(21) Appl. No.: 09/688,189

(22) Filed: Oct. 16, 2000

Related U.S. Application Data

(63) Continuation of application No. 09/147,375, filed as application No. PCT/JP97/01988 on Jun. 10, 1997, now abandoned.

(30) Foreign Application Priority Data

Jun. 11, 1996 (JP) .............................. 8-149429

(51) Int. Cl.$^7$ ............................ B32B 7/02; C03C 17/23

(52) U.S. Cl. ..................... 428/469; 428/216; 428/432; 428/472; 428/702; 359/359; 359/580; 359/585

(58) Field of Search ................................. 428/216, 428, 428/432, 433, 469, 472, 702; 359/359, 360, 580, 585; 204/192.1

(56) References Cited

U.S. PATENT DOCUMENTS 5,691,044 A * 11/1997 Oyama et al.
5,942,319 A * 8/1999 Oyama et al.
5,976,684 A * 11/1999 Oyama et al.

* cited by examiner

*Primary Examiner*—Deborah Jones
*Assistant Examiner*—Jennifer McNeil
(74) *Attorney, Agent, or Firm*—Oblon, Spivak, McClelland, Maier & Neustadt, P.C.

(57) ABSTRACT

A light absorptive antireflector provided with a titanium oxy-nitride film having a geometrical film thickness of from 5 to 25 nm, wherein O/Ti (atomic ratio)=0.11 to 0.33, and a film composed mainly of silica and having a geometrical film thickness of from 70 to 130 nm, and a process for its production.

20 Claims, 7 Drawing Sheets

LIGHT ABSORPTIVE ANTIREFLECTOR AND PROCESS FOR ITS PRODUCTION

This is a continuation of application Ser. No. 09/147,375 filed on Dec. 11, 1998, now abandoned, which is a 371 of PCT/JP97/01988, filed Jun. 10, 1997.

TECHNICAL FIELD

The present invention relates to a light absorptive antireflector and a process for its production.

BACKGROUND ART

Heretofore, antireflection and shielding of electromagnetic waves for e.g. a screen portion of a display, have been accomplished by laminating a low refractive index dielectric film, a high refractive index dielectric film and a high refractive index conductive film which are substantially transparent to visible light, from a substrate side (JP-A-60-168102). However, with an antireflection film of such a multilayer structure, it has been necessary to increase the number of layers constituting the antireflection film in order to broaden the wavelength range for low reflection, and there has been a problem that the production cost increases accordingly.

Further, a double layer antireflection film having a light absorptive film and a silica film laminated from a substrate side (DE3942990) has been proposed as one wherein the film structure has been simplified to accomplish the above-mentioned antireflection and shielding of electromagnetic waves. However, even if this light absorptive antireflection film of double layer structure comprising a light absorptive film such as a titanium nitride layer, and a silica film, was employed, the wavelength range for low reflection, of the obtainable light absorptive antireflector, was narrow, and the antireflection characteristics were inadequate.

It is an object of the present invention to provide a light absorptive antireflector which exhibits adequate antireflection characteristics with a simple layer structure, and a process for its production.

Another object of the present invention is to provide a light absorptive antireflector excellent in heat resistance with a simple layer structure, and a process for its production.

DISCLOSURE OF THE INVENTION

The present invention provides a light absorptive antireflector which comprises a substrate, and a titanium oxy-nitride film having a geometrical film thickness of from 5 to 25 nm and a film composed mainly of silica and having a geometrical film thickness of from 70 to 130 nm formed in this order on the substrate, to reduce reflection of incident light from the side of the film composed mainly of silica, wherein the ratio in the number of atoms of oxygen to titanium in said titanium oxy-nitride is from 0.11 to 0.33 (hereinafter referred to as the first invention).

Further, the present invention provides a light absorptive antireflector which comprises a substrate, and a titanium oxy-nitride film having a geometrical film thickness of from 15 to 30 nm, a dielectric film having a geometrical film thickness of from 10 to 30 nm and a refractive index of at least 1.7 and being substantially transparent to visible light, and a film composed mainly of silica and having a geometrical film thickness of from 50 to 90 nm formed in this order on the substrate, to reduce reflection of incident light from the side of the film composed mainly of silica, wherein the ratio in the number of atoms of oxygen to titanium in said titanium oxy-nitride is from 0.11 to 0.33 (hereinafter referred to as the second invention).

BEST MODE FOR CARRYING OUT THE INVENTION

Figure 1:
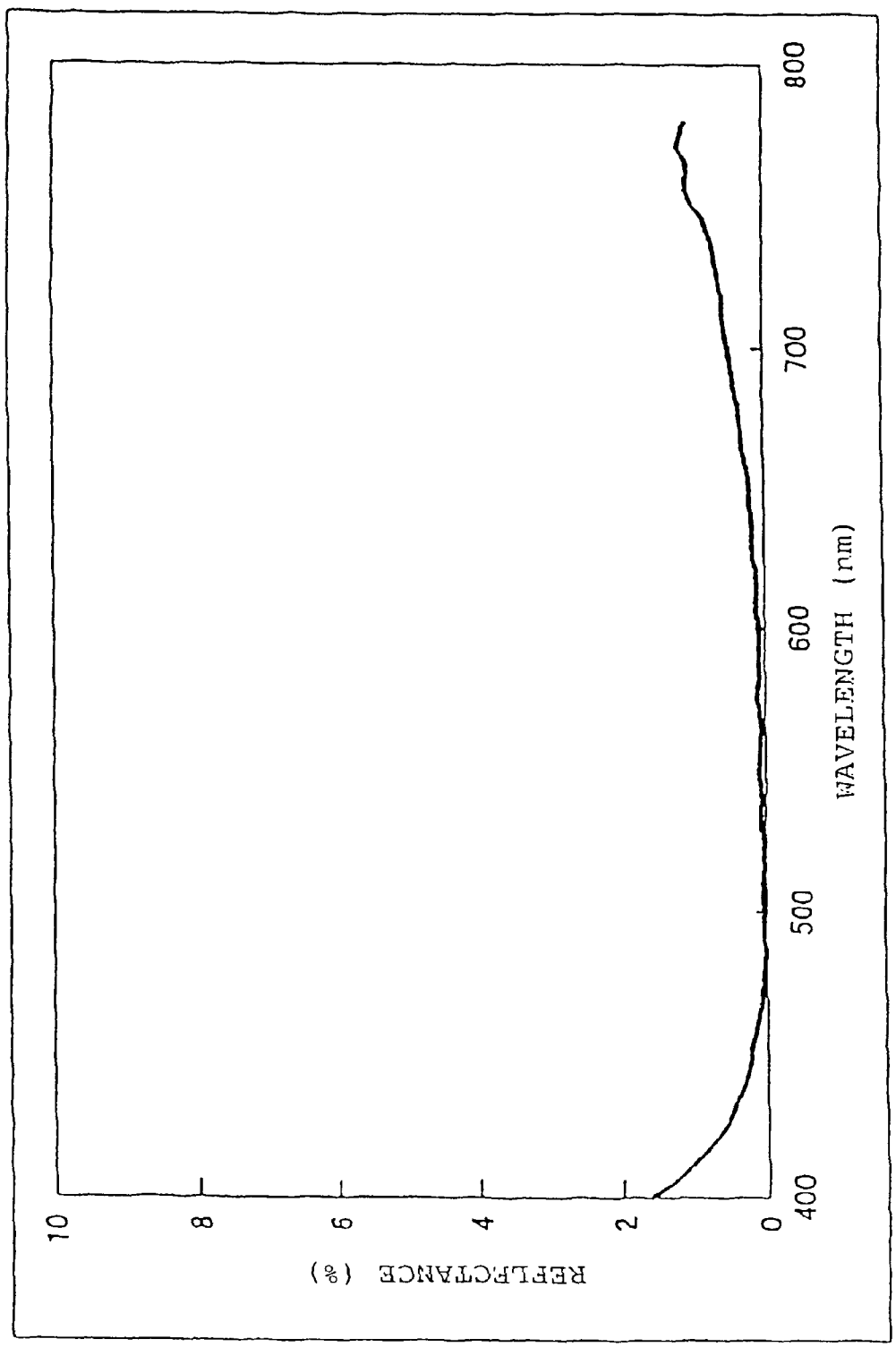
FIG. 1 is a graph showing the spectral reflectance of Example 1.

The light absorptive antireflector of the present invention contains a titanium oxy-nitride layer, and when the amount of oxygen contained in this titanium oxy-nitride is changed, the refractive index n and the extinction coefficient k will change, and the wavelength range for low reflection will also change accordingly. Namely, by adjusting the amount of oxygen in the titanium oxy-nitride, the antireflection performance can be improved. The simplest layer structure in the present invention is a double layer structure comprising a titanium oxy-nitride film wherein the oxygen content is optimized, and a film composed mainly of silica, as shown by the first invention.

With a double layer film structure, in a case of an antireflector employing, as the two layers, dielectric films which are substantially transparent to visible light, the refractive indices and the film thicknesses of the respective layers can be determined to bring the reflectance at a certain specific wavelength (which is called a design wavelength) to zero. However, at wavelengths other than the design wavelength, the reflectance sharply increases, thus becoming a so-called "V coat", whereby low reflection can not be attained within a wide wavelength range.

As in the present invention, by using a substance having a finite extinction coefficient i.e. a light absorptive substance, it is possible to form an antireflector showing low reflection within a wide wavelength range even with a double layer structure. The wavelength dependency (the wavelength dispersion) of the refractive index and the extinction coefficient of such a light absorptive substance is determined if the film thickness is determined. Namely, it is an essence of the present invention to employ a light absorptive substance whereby the wavelength dispersions of both the refractive index and the extinction coefficient become optimum simultaneously.

In the present invention, titanium oxy-nitride has been found as a light absorptive substance which is useful for an antireflector which exhibits low reflection within a wide wavelength range, and it has been found further that in order to broaden the low reflection wavelength range, it is important that the oxygen content is within a certain specific range.

In the present invention, as will be described hereinafter, in order to obtain a practical antireflector having a wide low reflection wavelength range, it is important that the ratio in the number of atoms of oxygen to titanium in the titanium oxy-nitride, is from 0.11 to 0.33. In a case where a lower reflection performance is required, the ratio in the number of atoms of oxygen to titanium is preferably from 0.14 to 0.28, particularly preferably from 0.16 to 0.26.

The film composed mainly of silica, to be used in the present invention, may be a film obtained by direct current sputtering of a conductive silicon target in the presence of an oxidizing gas. The method for forming the film composed mainly of silica is not particularly limited, and a dry method such as a CVD method or a sputtering method, or a wet method such as a spraying method, a spin coating method or a dipping method, may be employed. As the sputtering method, a radio frequency (RF) sputtering method or a direct current reactive sputtering method may be mentioned.

When a direct current reactive sputtering method is employed, in order to impart electrical conductivity to the silicon target, a metal such as boron, phosphorus or aluminum will be incorporated. As a result, such an element will be included as an impurity in the obtained silica. However, silica in the present invention is one having substantially the same refractive index as silica.

In the first invention, it is important to employ a titanium oxy-nitride film having a geometrical film thickness of from 5 to 25 nm and a film composed mainly of silica having a geometrical film thickness of from 70 to 130 nm.

If the film thickness of the titanium oxy-nitride film is less than 5 nm, the wavelength range for low reflection may be broadened, but the reflectance tends to increase, and if it exceeds 25 nm, the wavelength range for low reflection tends to be narrow, and if the film thickness is further increased, the reflectance tends to increase.

Further, if the film thickness of the film composed mainly of silica is decreased, the wavelength range for low reflection becomes a short wavelength region, and if the film thickness of the film composed mainly of silica is increased, the wavelength range for low reflection becomes a long wavelength region. Namely, in order to bring the wavelength range for low reflection to a visible light region, it is necessary to bring the film thickness of the film composed mainly of silica to a range of from 70 to 130 nm. The geometrical film thickness of the titanium oxy-nitride film is preferably from 7 to 20 nm, particularly preferably from 8 to 15 nm. By defining the film thickness of the titanium oxy-nitride within this range, the wavelength range for low reflection can be broadened, and the reflectance can be made low.

The geometrical film thickness of the film composed mainly of silica is preferably from 80 to 100 nm. By bringing the film thickness within this range, the wavelength range for low reflection will be in the vicinity of the center of the visible light region, and as the antireflector, the performance will further be improved.

In the second invention, it is important to employ a titanium oxy-nitride film having a geometrical film thickness of from 15 to 30 nm, a dielectric film having a geometrical film thickness of from 10 to 30 nm and a refractive index of at least 1.7 and being substantially transparent to visible light, and a film composed mainly of silica and having a geometrical film thickness of from 50 to 90 nm. The above dielectric film may, for example, be a titanium oxide film.

In the first invention, it is preferred that a layer composed mainly of a metal or a metal nitride and having a geometrical film thickness of from 1 to 20 nm, is formed between the titanium oxy-nitride film and the above film composed mainly of silica. Further, in the second invention, it is preferred that a layer composed mainly of a metal or a metal nitride and having a geometrical film thickness of from 1 to 20 nm, is formed between the titanium oxy-nitride film and the above dielectric film.

By inserting the above-mentioned layer composed mainly of a metal or a metal nitride as a layer (hereinafter referred to as a barrier layer) for preventing oxidation of the light absorptive film, between the light absorptive film and the silica film, it is possible to prevent the oxidation during the film formation, or to improve the heat resistance.

A barrier layer of this type is widely used in so-called Low-E glass employing a silver film, and it is disclosed that a barrier layer is formed for the purpose of preventing oxidation of a silver film during film formation of an oxide film which is formed on the silver film (U.S. Pat. No. 4,548,691 and JP-A-59-165001). Thus, such a barrier layer is a thin film formed to prevent oxidation of another layer formed beneath it and optically has no significance (namely, presents no substantial influence over the antireflection characteristics or the visible light transmittance). Further, it is important not to let it have any optical significance.

The film thickness of this barrier layer is preferably at most 20 nm in order not to impair the desired antireflection performance. If the film thickness of this barrier layer is less than 1 nm, improvement in heat resistance tends to be inadequate. Accordingly, it is preferred to insert a barrier layer having a film thickness of from 1 to 20 nm, whereby the heat resistance can effectively be improved.

As mentioned above, it is important that the barrier layer does not have any optical significance and when the barrier layer is light absorptive (such as a light absorptive silicon nitride), the thickness should be at most about 5 nm.

When a transparent barrier layer is employed, the allowable film thickness differs depending upon the refractive index of this layer. When a material having a refractive index of about 2.0 (such as silicon nitride or aluminum nitride) is employed, the allowable film thickness becomes largest, and a barrier layer of at most about 20 nm can be inserted between the light absorptive film as a lower layer and a dielectric layer as the upper layer, while maintaining the low reflection characteristics.

As the barrier layer, it is preferred to employ a film composed mainly of at least one metal selected from the group consisting of chromium, molybdenum, tungsten, vanadium, niobium, tantalum, zinc, nickel, palladium, platinum, aluminum, indium, tin and silicon or a film composed mainly of a nitride thereof, or a film composed mainly of at least one metal selected from the group consisting of titanium, zirconium and hafnium, whereby adequate improvement in the antioxidation performance and maintenance of excellent antireflection characteristics can both be attained. Particularly preferred is a layer composed mainly of silicon or silicon nitride.

Oxidation of silicon or silicon nitride exhibits an oxidation mechanism (oxidation mechanism B) wherein an oxide layer is formed gradually at a rate of one atom layer each time from the surface, rather than an oxidation mechanism (oxidation mechanism A) wherein oxygen diffuses in the depth direction from the surface with a concentration gradient, as observed with many other metals or metal nitrides.

It is possible that the titanium oxy-nitride is oxidized during the film formation of the film composed mainly of silica or during the subsequent heat treatment. Silicon or silicon nitride is used to prevent oxidation of the titanium oxy-nitride, and for this purpose, the silicon or the silicon nitride may become a partial oxide or silicon oxy-nitride.

In the above-mentioned oxidation mechanism A, it is possible that the titanium oxy-nitride is oxidized before the metal or the metal nitride is completely oxidized. Whereas, the silicon or the silicon nitride which exhibits the latter oxidation mechanism B, will protect the titanium oxy-nitride from oxidation until it is completely oxidized.

In order to present no influence over the optical performance of the antireflector, the film thickness of the layer composed mainly of silicon or silicon nitride may be set taking the state after oxidation into consideration. Silicon nitride which is transparent to visible light, presents no substantial influence over the optical characteristics of the antireflector, whereby the film thickness can be increased, and it is thereby possible to effectively prevent oxidation of titanium oxy-nitride.

The present invention further provides a process for producing a light absorptive antireflector which comprises a substrate, and a titanium oxy-nitride film having a geometrical film thickness of from 5 to 25 nm and a film composed mainly of silica and having a geometrical film thickness of from 70 to 130 nm formed in this order on the substrate, to reduce reflection of incident light from the side of the film composed mainly of silica, wherein said titanium oxy-nitride is formed by a sputtering method employing a target composed mainly of titanium, and the ratio in the number of atoms of oxygen to titanium is made to be from 0.11 to 0.33.

The present invention further provides a process for producing a light absorptive antireflector which comprises a substrate, and a titanium oxy-nitride film having a geometrical film thickness of from 15 to 30 nm, a dielectric film having a geometrical film thickness of from 10 to 30 nm and a refractive index of at least 1.7 and being substantially transparent to visible light, and a film composed mainly of silica and having a geometrical film thickness of from 50 to 90 nm formed in this order on the substrate, to reduce reflection of incident light from the side of the film composed mainly of silica, wherein said titanium oxy-nitride is formed by a sputtering method employing a target composed mainly of titanium, and the ratio in the number of atoms of oxygen to titanium is made to be from 0.11 to 0.33.

The method for forming titanium oxy-nitride is not particularly limited, and a CVD method or a sputtering method may, for example, be employed. As the sputtering method, a RF sputtering method or a direct current reactive sputtering method may be mentioned. It is particularly preferred to employ a direct current reactive sputtering method, wherein a mixed gas comprising nitrogen, a rare gas and an oxidizing gas, is used as the sputtering gas.

The direct current reactive sputtering method does not require heating of the substrate as required by the CVD method, and the temperature rise of the substrate during the film forming process is small as compared with the RF sputtering method, whereby the substance useful as the substrate, is less restrictive, and it is easy to form an antireflector on a substrate with a large area.

Further, the compositional ratio of gasses can be adjusted in correspondence with the electric power applied to the titanium target during the film formation, and as a result, the atomic ratio of oxygen to titanium in the titanium oxy-nitride can be adjusted. Accordingly, it is preferred to employ a mixed gas comprising nitrogen, a rare gas and an oxidizing gas.

As the oxidizing gas, it is preferred to employ at least one gas selected from the group consisting of oxygen, ozone, nitrogen monoxide, nitrogen dioxide, nitrous oxide, carbon dioxide and water, because these gasses are oxidizing gasses which make it easy to adjust the ratio in the number of atoms of oxygen to titanium contained in the titanium oxy-nitride to the optimum level, at the time of introducing oxygen atoms to the obtained film.

In order to obtain titanium oxy-nitride which is capable of broadening the wavelength range for low reflection for a light absorptive antireflector, it is preferred to employ, as the above-mentioned mixed gas, a gas containing oxygen with an oxygen content of at most 5 vol %, whereby the range of the electric power to be applied to the titanium target can be broadened, and film formation of the titanium oxy-nitride can further be facilitated, The oxygen content in this mixed gas is more preferably at most 2 vol %, further preferably at most 1.2 vol %.

The substrate to be used in the present invention, may, for example, be glass, a plastic or a plastic film. Specifically, it may, for example, be glass, a plastic or a plastic film constituting a screen portion of a display device, or glass, a plastic or a plastic film constituting a window of a building or a mobile body such as an automobile. Further, it may, for example, be glass, a plastic or a plastic film constituting a portion which protects an accommodated product such as a display and which secures visibility. The material for the plastic or the plastic film may, for example, be PET (polyethylene terephthalate).

As a preferred application example, a case wherein the light absorptive antireflector of the present invention is used as a front panel (panel) of CRT, may be mentioned. After the light absorptive antireflection film of the present invention is formed on such a panel, a funnel and an electron gun which are two other parts constituting CRT, are required to be heated and fused to the panel by means of a low melting point powder glass as an adhesive. This heat-fusing step is carried out by maintaining these constituting parts in a closely contacted state at a temperature of about 450° C. for 30 minutes, and to complete CRT, it is necessary to carry out this step twice. In this heat-fusing step, the barrier layer in the present invention will play a role of preventing oxidation of the titanium oxy-nitride film.

In the following Examples, the ratio in the number of atoms of oxygen to titanium contained in the titanium oxy-nitride, was obtained by ESCA and a Rutherford scattering method of helium. This procedure will be described in detail as follows. As a sample for the Rutherford scattering method, titanium oxy-nitride was formed in a thickness of 100 nm on a graphite substrate, and silicon nitride was formed in a thickness of 10 nm thereon for prevention of oxidation and prevention of contamination. This sample was subjected to an energy spectro analysis of back scatter intensity of He positive ions having an incident energy of 2.3 MeV and a mass number of 4, to obtain the ratio in the number of atoms of oxygen to titanium. An error in this value is usually within 10%.

On the other hand, titanium oxy-nitride was formed in a thickness of 20 nm on a soda lime glass under the same film-forming condition as for the titanium oxy-nitride used in the Rutherford scattering method, and silicon nitride was formed in a thickness of 3 nm thereon. This product was subjected to sputtering with argon ions for 4 minutes to expose contaminant-free titanium oxy-nitride in vacuum, whereupon the composition of this surface was analyzed by ESCA. A ratio between this ratio in the number of atoms of oxygen to titanium obtained by ESCA and the ratio in the number of atoms of oxygen to titanium obtained by the Rutherford scattering, was obtained, and it was used as a coefficient to correct the ratio in the number of atoms of oxygen to titanium obtained by ESCA.

In ESCA, it is required to remove the surface reaction layer and contaminated layer by sputtering with argon ions. By this treatment, the ratio in the number of atoms of oxygen to titanium becomes smaller than the actual value. Further, the ratio in the number of atoms of oxygen to titanium gradually decreases as the sputtering time passes. Accordingly, the ratio in the number of atoms of oxygen to titanium in titanium oxy-nitride in the following Examples, was obtained by forming 20 nm of titanium oxy-nitride and 3 nm of silicon nitride on a soda lime glass in this order in the same manner as described above under the conditions of the respective Examples, carrying out sputtering with argon ions for 4 minutes, analyzing the composition by ESCA, and using a coefficient for correction preliminarily obtained.

Further, to evaluate the low reflection wavelength range, one obtained by dividing the wavelength of the high wavelength side where the reflectance becomes 0.6%, by the wavelength of the low wavelength side where the reflectance becomes 0.6%, was defined as a bandwidth ratio, and such a bandwidth ratio was obtained.

EXAMPLE 1

A film-forming chamber was evacuated to $2\,\mu$ Torr, and then titanium oxy-nitride having a film thickness of 9 nm was formed on a soda lime glass flat plate by a direct current reactive sputtering method by introducing a sputtering gas comprising 10 vol % of nitrogen gas, 0.69 vol % of oxygen gas and the rest being argon gas into the film-forming chamber and by applying an electric power of 0.26 kW to a titanium target having a size of 20 cm×7 cm×0.5 cm.

Then, silicon nitride having a film thickness of 5 nm was formed by a direct current reactive sputtering method by using a sputtering gas comprising 30 vol % of nitrogen gas and the rest being argon gas and by applying an electric power of 0.39 kW to a n-type silicon target having a size of 20 cm×7 cm×0.5 cm.

Then, silica having a film thickness of 90 nm was formed by a direct current reactive sputtering method by using a sputtering gas comprising 60 vol % of oxygen gas and the rest being argon gas and by applying an electric power of 0.77 kW to a n-type silicon target having a size of 20 cm×7 cm×0.5 cm.

The ratio in the number of atoms of oxygen to titanium contained in the obtained sample of titanium oxy-nitride, was 0.21. A black coating material was coated on the glass surface of the obtained sample on which no film was formed, and the spectral reflectance on the side having the films formed, was measured. The obtained spectral reflectance is shown in FIG. 1. The bandwidth ratio was 1.71. Thus, a light absorptive anti-reflector having a very broad low reflection wavelength range, was obtained.

EXAMPLE 2

Comparative Example

Titanium nitride having a film thickness of 9 nm was formed on a soda lime glass flat plate in the same manner as in Example 1 except that as the sputtering gas for the step of forming titanium oxy-nitride, a sputtering gas comprising 10 vol % of nitrogen gas and the rest being argon gas, was used instead of the sputtering gas comprising 10 vol % of nitrogen gas, 0.69 vol % of oxygen gas and the rest being argon gas. Then, in the same manner as in Example 1, silicon nitride having a film thickness of 5 nm and silica having a film thickness of 90 nm were formed in this order.

Figure 2:
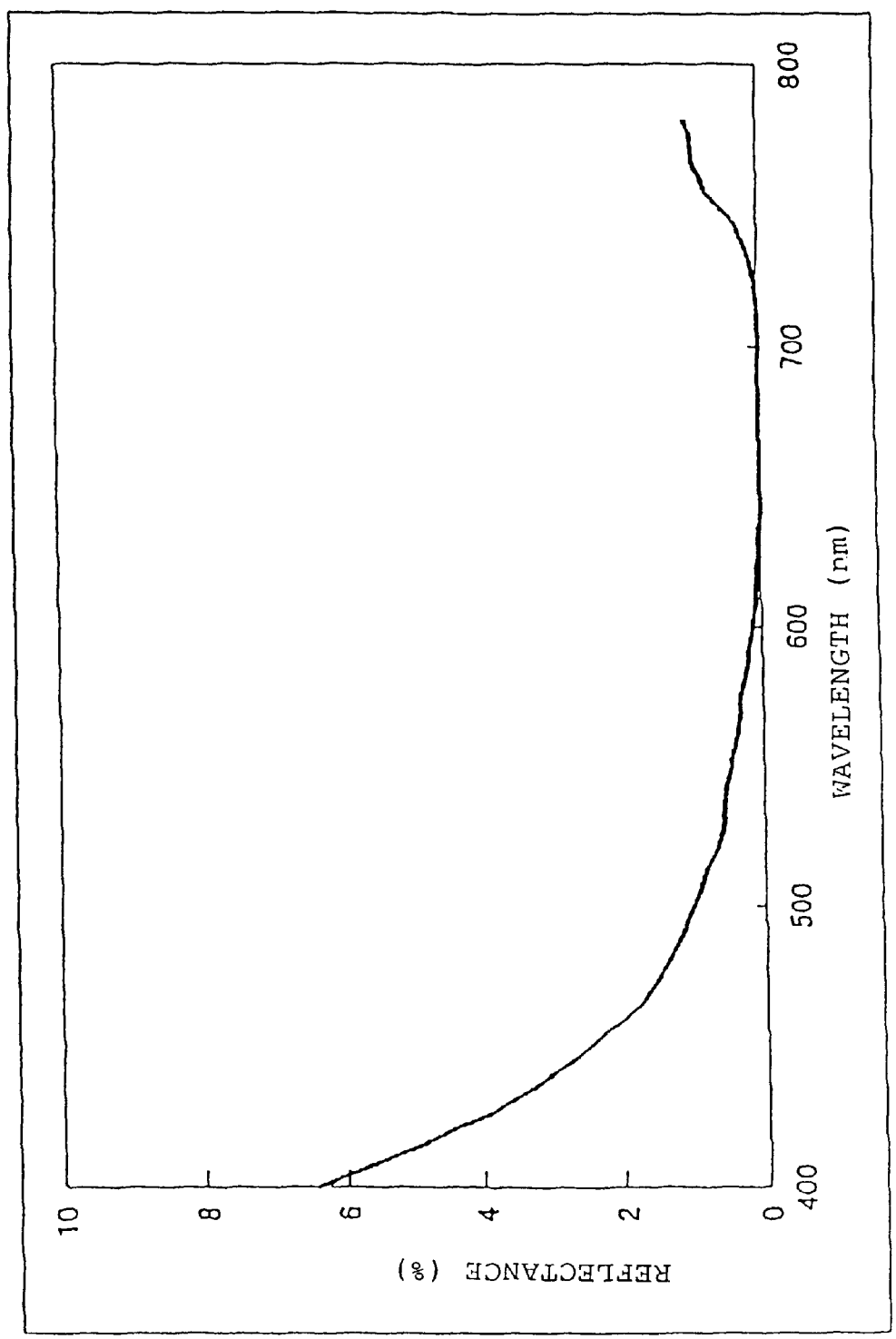
FIG. 2 is a graph showing the spectral reflectance of Example 2.

Also in the titanium nitride of the obtained sample, oxygen was contained in a very small amount, and the ratio in the number of atoms of oxygen to titanium was 0.09. The spectral reflectance on the side having the films formed, as measured in the same manner as in Example 1, is shown in FIG. 2 The bandwidth ratio was 1.464. As compared with Example 1, it is evident that if no oxygen is incorporated in the sputtering gas, the low reflection performance becomes inadequate.

EXAMPLE 3

Comparative Example

Titanium oxy-nitride having a film thickness of 9 nm was formed on a soda lime glass flat plate in the same manner as in Example 1 except that as the sputtering gas for the step for forming titanium oxy-nitride, a sputtering gas comprising 10 Vol % of nitrogen gas, 1.85 vol % of oxygen gas and the rest being argon gas, was used instead of the sputtering gas comprising 10 Vol % of nitrogen gas, 0.69 vol % of oxygen gas and the rest being argon gas. Then, in the same manner as in Example 1, silicon nitride having a film thickness of 5 nm and silica having a film thickness of 90 nm were formed.

Figure 3:
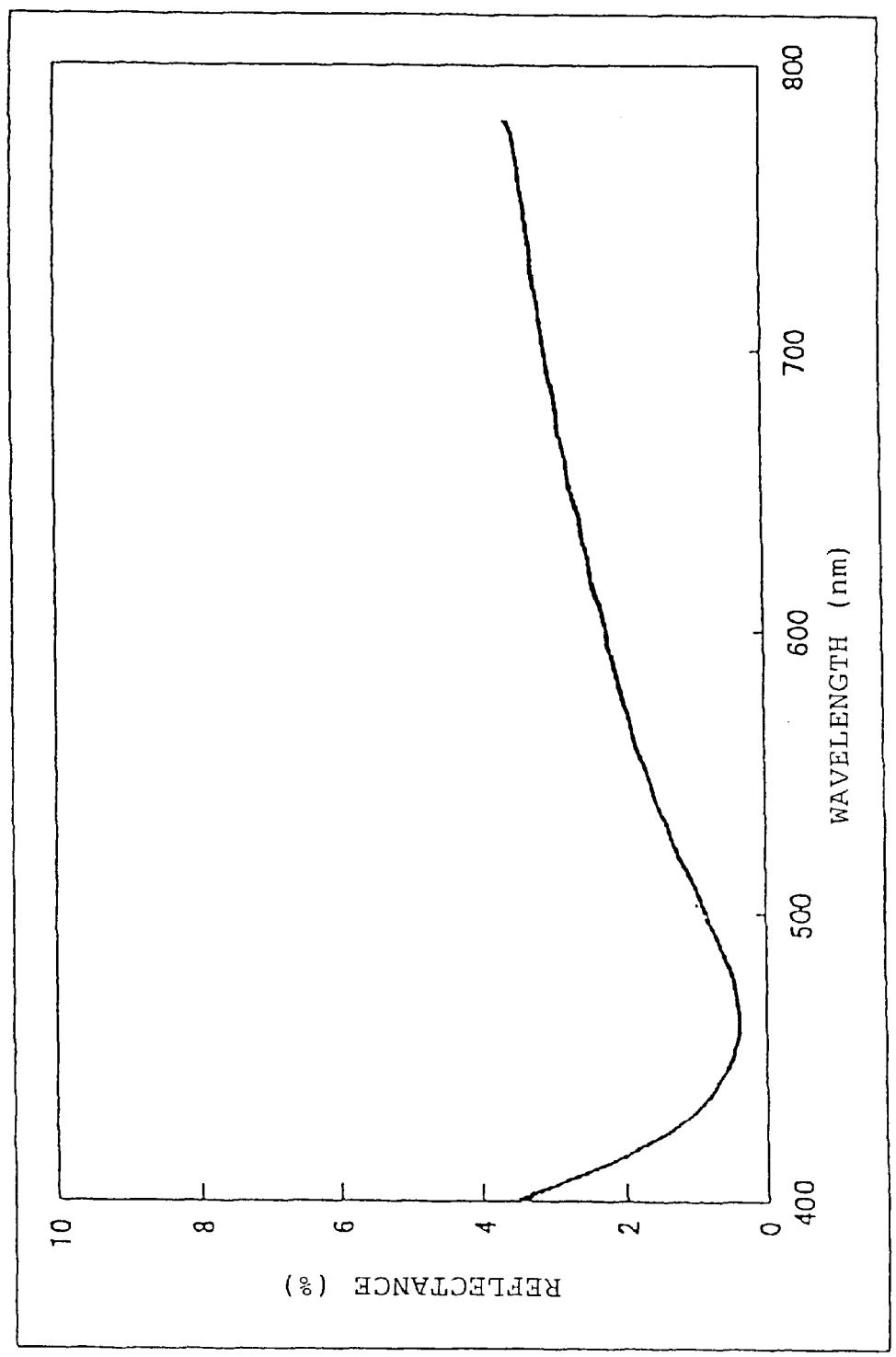
FIG. 3 is a graph showing the spectral reflectance of Example 3.

The ratio in the number of atoms of oxygen to titanium contained in the titanium oxy-nitride of the obtained sample was 0.78. The spectral reflectance on the side having the films formed, as measured in the same manner as in Example 1, is shown in FIG. 3. The bandwidth ratio was 1.091. As compared with Example 1, it is evident that if titanium oxy-nitride wherein the oxygen concentration contained in the titanium oxy-nitride is not proper, is used as a light absorptive substance, the low reflection range of the obtainable light absorptive antireflector becomes narrow, and the low reflect-ion performance is inadequate.

EXAMPLE 4

Various light absorptive antireflectors were obtained in the same manner as in Example 1 except that as the sputtering gas for the step for forming titanium oxy-nitride, sputtering gasses comprising 10 Vol % of nitrogen gas, various concentrations of oxygen gas and the rest being argon gas, were used.

Figure 4:
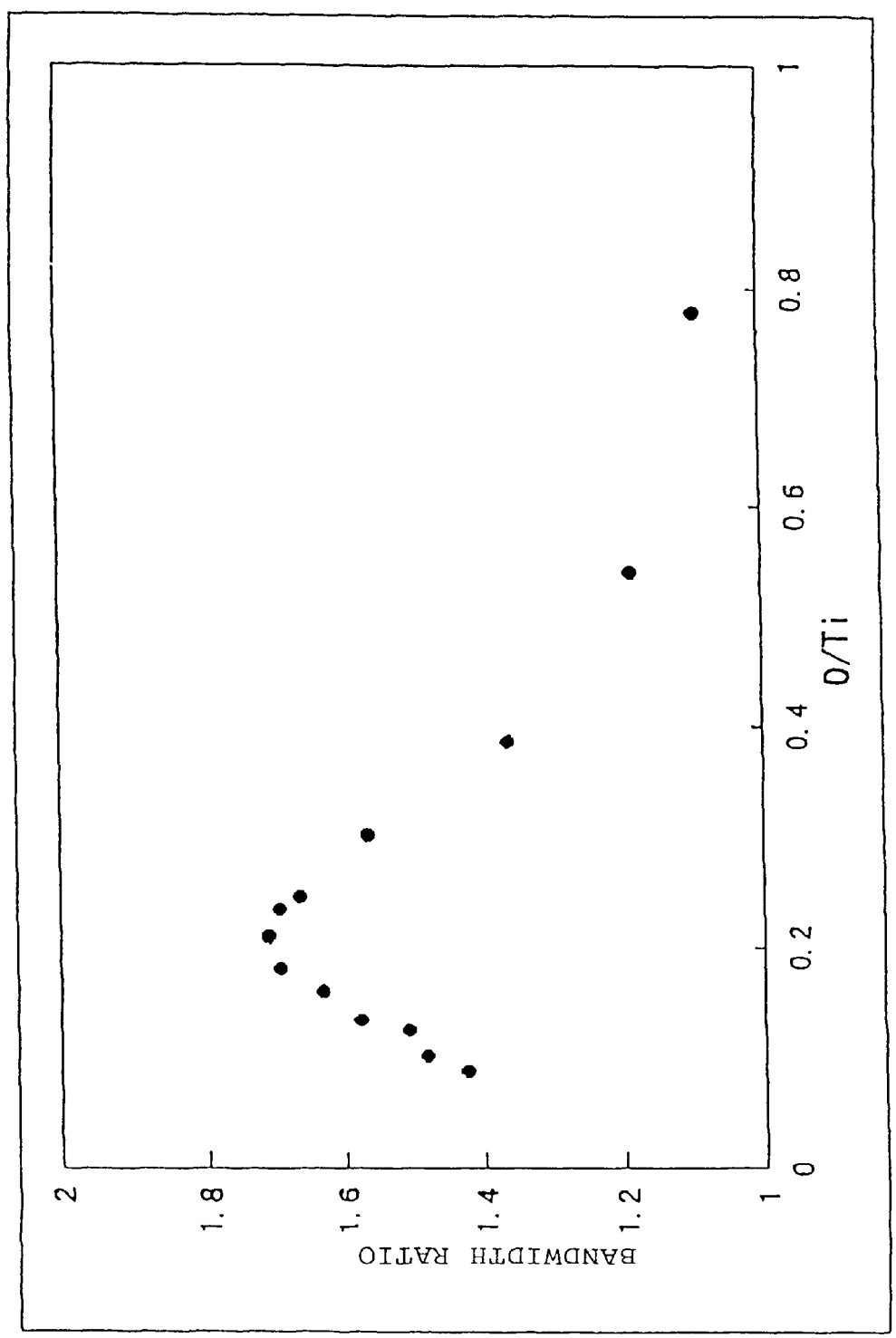
FIG. 4 is a graph showing the relation between the bandwidth ratio and the ratio in the number of atoms of oxygen to titanium contained in the titanium oxy-nitride of Examples 1 to 4.

The ratio in the number of atoms of oxygen to titanium contained in the titanium oxy-nitride in each obtained sample, and the bandwidth ratio were obtained, and they were plotted in FIG. 4 wherein the ordinate represents the bandwidth ratio, and the abscissa represents the ratio in the number of atoms of oxygen to titanium. Further, in FIG. 4, values of Examples 1 to 3 were also plotted.

From FIG. 4, it is evident that with an increase of the ratio in the number of atoms of oxygen to titanium contained in the titanium oxy-nitride, the bandwidth ratio increases once and then decreases, i.e. the low reflection range broadens once and then becomes narrow again. From this, it is evident that it is necessary to form titanium oxy-nitride so that oxygen contained in the titanium oxy-nitride becomes within a specific range depending upon the desired low reflection performance of the light absorptive antireflector.

From FIG. 4, the ratio of the number of oxygen atoms to the number of titanium atoms in the titanium oxy-nitride used for an antireflector having a broad wavelength range for low reflection i.e. having a bandwidth ratio of at least 1.5, becomes from 0.11 to 0.33.

For an application where a lower reflection ability is required, titanium oxy-nitride having a broader wavelength range for low reflection i.e. having a bandwidth ratio of at least 1.60, is employed, and the ratio of the number of oxygen atoms to the number of titanium atoms becomes from 0.14 to 0.28.

Further, for an application where a severer low reflection ability is required, titanium oxy-nitride having a still broader wavelength range for low reflection i.e. having a bandwidth ratio of at least 1.65, is employed, and the ratio of the number of oxygen atoms to the number of titanium atoms becomes from 0.16 to 0.26.

Figure 7:
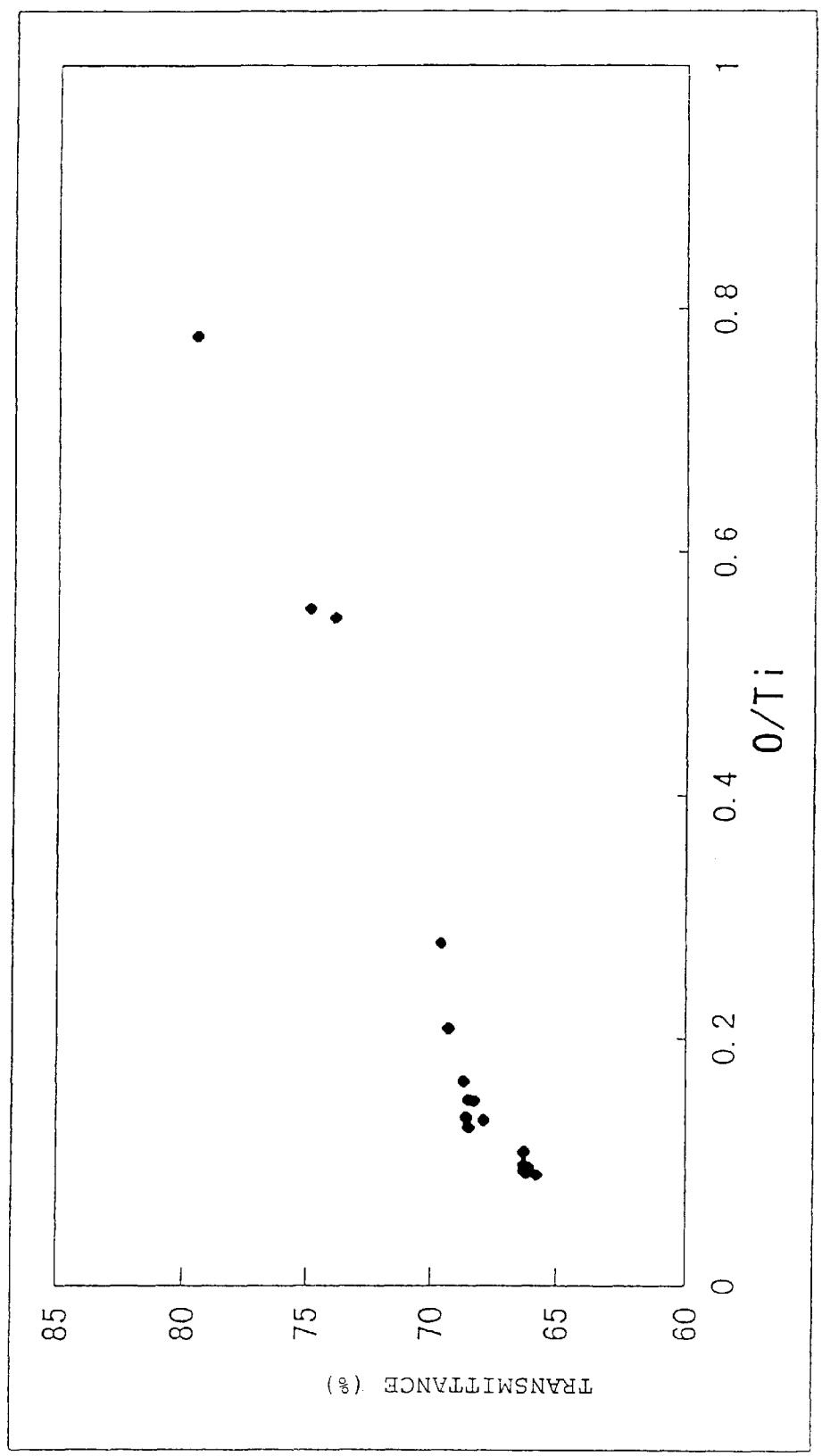
FIG. 7 is a graph showing the relation between the visible light transmittance and the ratio in the number of atoms of oxygen to titanium.

The visible light transmittance of the obtained light absorptive antireflector was measured, whereby it was as shown in FIG. 7. From FIG. 7, it is evident that with an increase of the ratio in the number of atoms of oxygen to titanium contained in the titanium oxy-nitride, the visible light transmittance of the light absorptive antireflector simply increases.

EXAMPLE 5

In the same manner as in Example 1, titanium oxy-nitride having a film thickness of 9 nm was formed on a soda lime glass flat plate Then, silica having a film thickness of 90 nm was formed by using a sputtering gas comprising 60 vol % of oxygen gas and the rest being argon gas and by applying an electric power of 0.34 kW to a n-type silicon target having a size of 20 cm×7 cm×0.5 cm.

Figure 5:
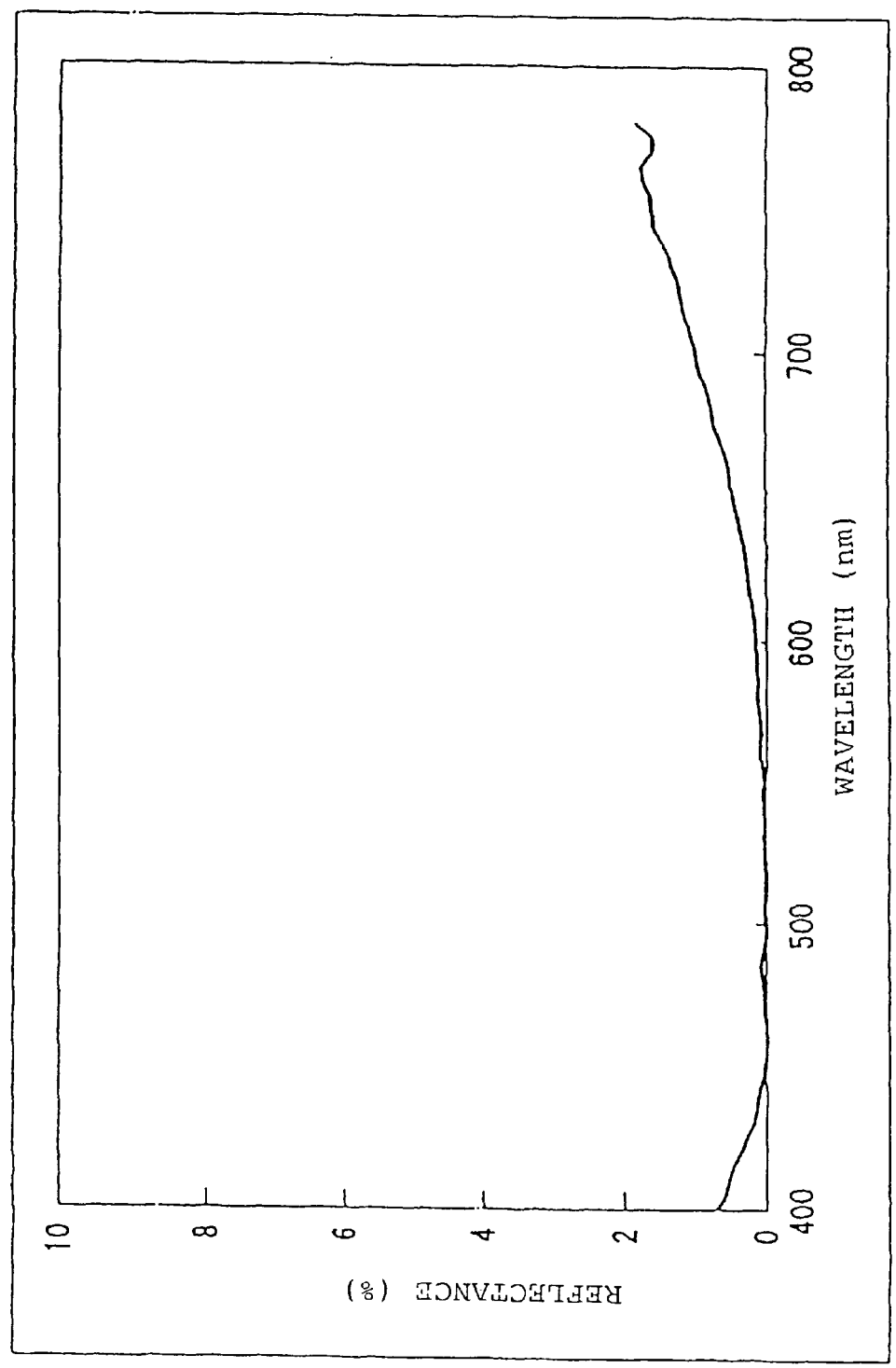
FIG. 5 is a graph showing the spectral reflectance of Example 5.

The ratio in the number of atoms of oxygen to titanium contained in the titanium oxy-nitride of the obtained sample was 0.25. The spectral reflectance on the side having the films formed, as measured in the same manner as in Example 1, is shown in FIG. 5. The bandwidth ratio was 1.649. Thus, a light absorptive antireflector having a very broad low reflection wavelength range, was obtained. As compared with Example 1, the low reflection range of Example 5 is slightly narrow. This is believed to be attributable to the fact that titanium oxy-nitride was oxidized to some extent during the film formation of silica.

EXAMPLE 6

A film-forming chamber was evacuated to 2 μ Torr, and then titanium oxy-nitride having a film thickness of 15 nm was formed on a soda lime glass flat plate by a direct current reactive sputtering method by introducing a sputtering gas comprising 10 Vol % of nitrogen gas, 0.69 vol % of oxygen gas and the rest being argon gas, into the film-forming chamber and by applying an electric power of 0.26 kW to a titanium target having a size of 20 cm×7 cm×0.5 cm.

Then, silicon nitride having a film thickness of 5 nm was formed by a direct current reactive sputtering method by using a sputtering gas comprising 30 vol % of nitrogen gas and the rest being argon gas and by applying an electric power of 0.39 kW to a n-type silicon target having a size of 20 cm×7 cm×0.5 cm.

Then, titanium oxide having a film thickness of 18 nm was formed by a direct current reactive sputtering method by using a sputtering gas comprising 40 vol % of oxygen gas and the rest being argon gas and by applying an electric power of 0.77 kW to a titanium target having a size of 20 cm×7 cm×0.5 cm.

Then, silica having a film thickness of 63 nm was formed by a direct current reactive sputtering method by using a sputtering gas comprising 60 vol % of oxygen gas and the rest being argon gas and by applying an electric power of 0.77 kW to a n-type silicon target having a size of 20 cm×7 cm×0.5 cm.

Figure 6:
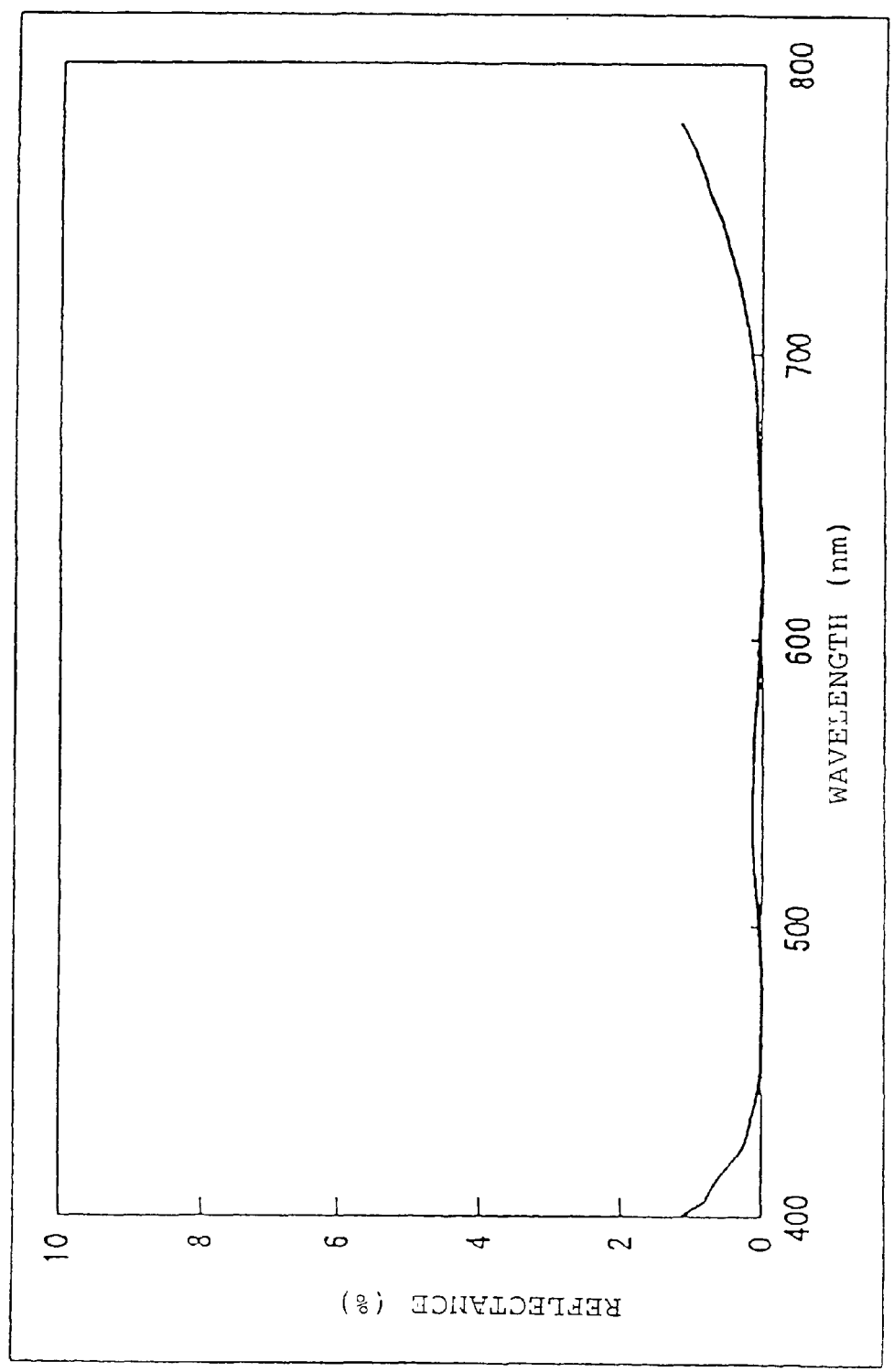
FIG. 6 is a graph showing the spectral reflectance of Example 6.

The ratio in the number of atoms of oxygen to titanium contained in the titanium oxy-nitride of the obtained sample was 0.21. The spectral reflectance on the side having the films formed, as measured in the same manner as in Example 1, is shown in FIG. 6. The bandwidth ratio was 1.800. Thus, a light absorptive antireflector having a very broad low reflection wavelength range was obtained.

EXAMPLE 7

A film-forming chamber was evacuated to 4 μ Torr, and then titanium oxy-nitride having a film thickens of 9 nm was formed on a panel of CRT by a direct current reactive sputtering method by introducing a sputtering gas comprising 10 Vol % of nitrogen gas, 0.69 vol % of oxygen gas and the rest being argon gas and by applying an electric power of 26 kW to a titanium target having a size of 200 cm×70 cm×1.2 cm.

Then, silicon nitride having a film thickness of 5 nm was formed by a direct current reactive sputtering method by using a sputtering gas comprising 30 vol % of nitrogen gas and the rest being argon gas and by applying an electric power of 39 kW to a n-type silicon target having a size of 200 cm×70 cm×1 cm.

Then, silica having a film thickness of 90 nm was formed by a direct current reactive sputtering method by using a sputtering gas comprising 60 vol % of oxygen gas and the rest being argon gas and by applying an electric power of 77 kW to a n-type silicon target having a size of 200 cm×70 cm×1 cm.

The ratio in the number of atoms of oxygen to titanium contained in the titanium oxy-nitride of the obtained sample was 0.21.

To complete CRT, heat treatment in an atmosphere of 450° C. for 30 minutes was repeated twice. After the heat treatment, the spectral reflectance on the side having the films formed, was measured, whereby it was confirmed that there was no substantial change between before and after the heat treatment.

From this result, it is evident that the light absorptive antireflector of the present invention has adequate heat resistance.

INDUSTRIAL APPLICABILITY

The light absorptive antireflector of the present invention exhibits adequate antireflection characteristics with a simple layer structure. Further, it is excellent in heat resistance. The light absorptive antireflector of the present invention is preferably employed particularly as a panel for CRT or as a telepanel to be attached to the front of CRT.

What is claimed is:

1. A light absorptive antireflector which comprises a substrate, and a titanium oxy-nitride film having a geometrical film thickness of from 5 to 25 nm and a film composed mainly of silica and having a geometrical film thickness of from 70 to 130 nm formed in this order on the substrate, to reduce reflection of incident light from the side of the film composed mainly of silica, wherein the ratio of the number of atoms of oxygen to titanium in said titanium oxy-nitride is from 0.11 to 0.20.

2. The light absorptive antireflector according to claim 1, wherein a layer composed mainly of a metal or a metal nitride and having a geometrical film thickness of from 1 to 20 nm, is formed between said titanium oxy-nitride film and said film composed mainly of silica.

3. A light absorptive antireflector which comprises a substrate, and a titanium oxy-nitride film having a geometrical film thickness of from 15 to 30 nm, a dielectric film having a geometrical film thickness of from 10 to 30 nm and a refractive index of at least 1.7 and being substantially transparent to visible light, and a film composed mainly of silica and having a geometrical film thickness of from 50 to 90 nm formed in this order on the substrate, to reduce reflection of incident light from the side of the film composed mainly of silica, wherein the ratio in the number of atoms of oxygen to titanium in said titanium oxy-nitride is from 0.11 to 0.20.

4. The light absorptive antireflector according to claim 3, wherein a layer composed mainly of a metal or a metal nitride and having a geometrical film thickness of from 1 to 20 nm, is formed between said titanium oxy-nitride film and said dielectric film.

5. The light absorptive antireflector according to claims 2 or 4, wherein said layer composed mainly of a metal or a metal nitride is a layer composed mainly of silicon or silicon nitride.

6. A process for producing a light absorptive antireflector which comprises a substrate, and a titanium oxy-nitride film having a geometrical film thickness of from 5 to 25 nm and a film composed mainly of silica and having a geometrical film thickness of from 70 to 130 nm formed in this order on the substrate, to reduce reflecting of incident light from the side of the film composed mainly of silica, wherein said titanium oxy-nitride is formed by a sputtering method employing a target composed mainly of titanium, and the ratio in the number of atoms of oxygen to titanium is made to be from 0.11 to 0.20.

7. A process for producing a light absorptive antireflector which comprises a substrate, and titanium oxy-nitride film having a geometrical film thickness of from 15 to 30 nm, a dielectric film having a geometrical film thickness of from 10 to 30 nm and a refractive index of at least 1.7 and being substantially transparent to visible light, and a film composed mainly of silica and having a geometrical film thickness of from 50 to 90 nm formed in this order on the substrate, to reduce reflection of incident light from the side of the film composed mainly of silica, wherein said titanium oxy-nitride is formed by a sputtering method employing a target composed mainly of titanium, and the ratio in the number of atoms of oxygen to titanium is made to be from 0.11 to 0.20.

8. The process for producing a light absorptive antireflector according to claims 6 or 7, wherein a direct current reactive sputtering method is used as the method for forming said titanium oxy-nitride, and a mixed gas comprising nitrogen, a rare gas and an oxidizing gas is used as the sputtering gas.

9. The process for producing a light absorptive antireflector according to claim 8, wherein at least one gas selected from the group consisting of oxygen, ozone, nitrogen monoxide, nitrogen dioxide, nitrous oxide, carbon dioxide and water, is used as said oxidizing gas.

10. The process for producing a light absorptive antireflector according to claim 8, wherein a gas containing oxygen with an oxygen content of at most 5 vol %, is used as said mixed gas.

11. A light absorptive antireflector which comprises a substrate, and a titanium oxy-nitride film having a geometrical film thickness of from 5 to 25 nm and a film composed mainly of silica and having a geometrical film thickness of from 70 to 130 nm formed in this order on the substrate, to reduce reflection of incident light from the side of the film composed mainly of silica, wherein the ratio of the number of atoms of oxygen to titanium in said titanium oxy nitride is from 0.21 to 0.33.

12. The light absorptive antireflector according to claim 11, wherein a layer composed mainly of a metal or a metal nitride and having a geometrical film thickness of from 1 to 20 nm, is formed between said titanium oxy-nitride film and said film composed mainly of silica.

13. A light absorptive antireflector which comprises a substrate, and a titanium oxy-nitride film having a geometrical film thickness of from 15 to 30 nm, a dielectric film having a geometrical film thickness of from 10 to 30 nm and a refractive index of at least 1.7 and being substantially transparent to visible light, and a film composed mainly of silica and having a geometrical film thickness of from 50 to 90 nm formed in this order on the substrate, to reduce reflection of incident light from the side of the film composed mainly of silica, wherein the ratio in the number of atoms of oxygen to titanium in said titanium oxy-nitride is from 0.21 to 0.33.

14. The light absorptive antireflector according to claim 13, wherein a layer composed mainly of a metal or a metal nitride and having a geometrical film thickness of from 1 to 20 nm, is formed between said titanium oxy-nitride film and said dielectric film.

15. The light absorptive antireflector according to claims 12 or 14, wherein said layer composed mainly of a metal or a metal nitride is a layer composed mainly of silicon or silicon nitride.

16. A process for producing a light absorptive antireflector which comprises a substrate, and a titanium oxy-nitride film having a geometrical film thickness of from 5 to 25 nm and a film composed mainly of silica and having a geometrical film thickness of from 70 to 130 nm formed in this order on the substrate, to reduce reflecting of incident light from the side of the film composed mainly of silica, wherein said titanium oxy-nitride is formed by a sputtering method employing a target composed mainly of titanium, and the ratio in the number of atoms of oxygen to titanium is made to be from 0.21 to 0.33.

17. A process for producing a light absorptive antireflector which comprises a substrate, and titanium oxy-nitride film having a geometrical film thickness of from 15 to 30 nm, a dielectric film having a geometrical film thickness of from 10 to 30 nm and a refractive index of at least 1.7 and being substantially transparent to visible light, and a film composed mainly of silica and having a geometrical film thickness of from 50 to 90 nm formed in this order on the substrate, to reduce reflection of incident light from the side of the film composed mainly of silica, wherein said titanium oxy-nitride is formed by a sputtering method employing a target composed mainly of titanium, and the ratio in the number of atoms of oxygen to titanium is made to be from 0.21 to 0.33.

18. The process for producing a light absorptive antireflector according to claims 16 or 17, wherein a direct current reactive sputtering method is used as the method for forming said titanium oxy-nitride, and a mixed gas comprising nitrogen, a rare gas and an oxidizing gas is used as the sputtering gas.

19. The process for producing a light absorptive antireflector according to claim 18, wherein at least one gas selected from the group consisting of oxygen, ozone, nitrogen monoxide, nitrogen dioxide, nitrous oxide, carbon dioxide and water, is used as said oxidizing gas.

20. The process for producing a light absorptive antireflector according to claim 18, wherein a gas containing oxygen with an oxygen content of at most 5 vol %, is used as said mixed gas.

* * * * *